G. F. SHIMMIN.
REAR FRAMING OF MOTOR CYCLES AND THE LIKE.
APPLICATION FILED JAN. 12, 1914.
1,157,431.
Patented Oct. 19, 1915.
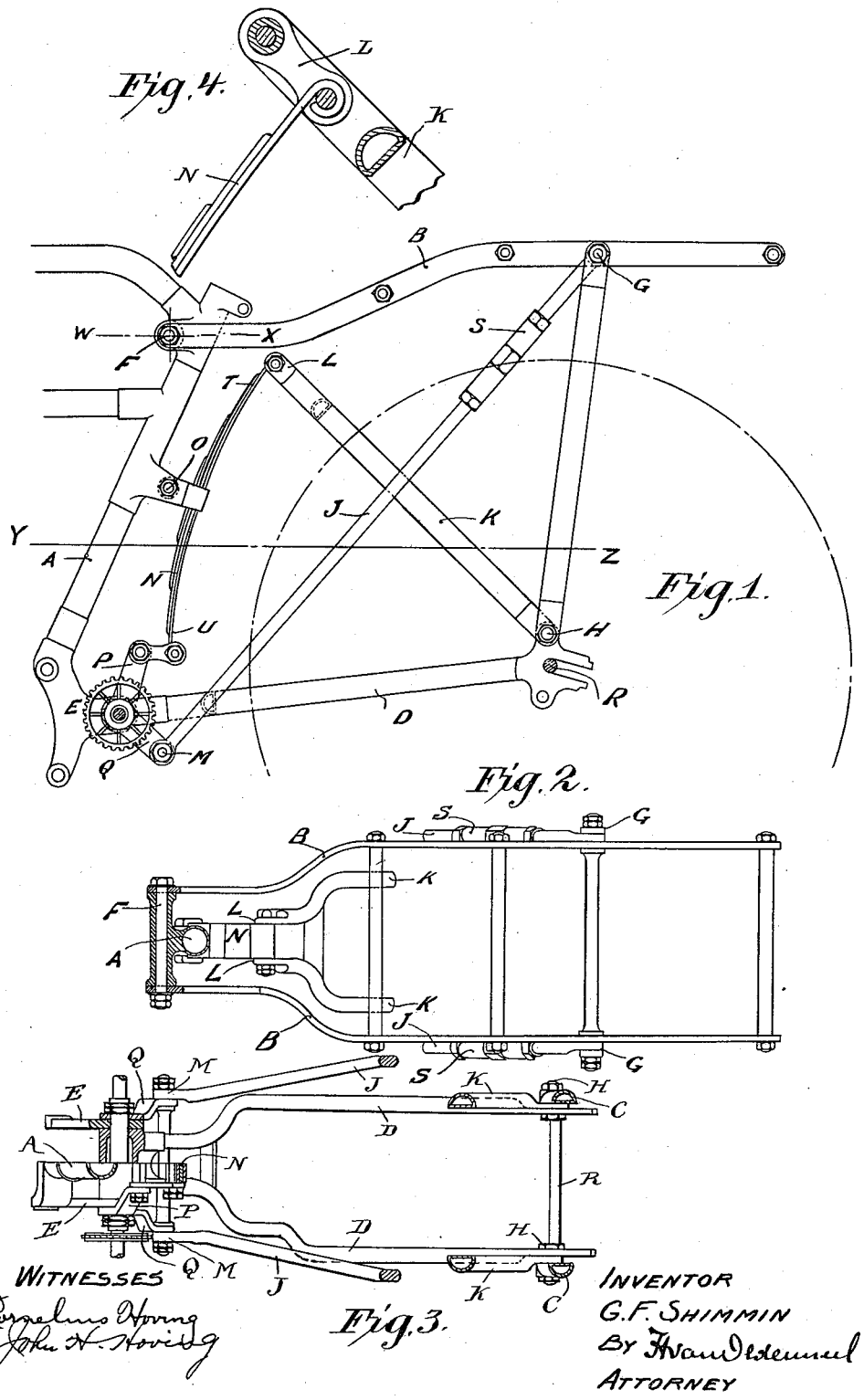

UNITED STATES PATENT OFFICE.

GEORGE FEATHERSTONE SHIMMIN, OF MARYPORT, ENGLAND.

REAR FRAMING OF MOTOR-CYCLES AND THE LIKE.

1,157,431.  Specification of Letters Patent.  Patented Oct. 19, 1915.

Application filed January 12, 1914. Serial No. 811,634.

*To all whom it may concern:*

Be it known that I, GEORGE FEATHERSTONE SHIMMIN, a subject of the King of the United Kingdom of Great Britain and Ireland, and resident of Maryport, England, have invented a certain new and useful Improvement in the Rear Framing of Motor-Cycles and the like, of which the following is a specification.

This invention relates to improvements in the rear framing of motor cycles and the like and has for its object to provide a construction designed to minimize road shock.

In accordance with this invention the rear frame is arranged as a deformable frame preferably though not necessarily of parallelogram form, diagonal rods connecting the rearmost corners of the frame to a laminated spring pivotally connected to the foremost side of the rear frame.

In the annexed drawings illustrating the invention, Figure 1 is an elevation illustrating a framing in accordance with the invention. Fig. 2 is a plan with a part section on the line W, X, showing the upper member of the frame and Fig. 3 is a section on the line Y, Z, showing the lower member of the frame. Fig. 4 is a side sectional elevation showing alternative means for connecting the compression diagonals to the upper end of the spring.

As shown in Fig. 1, the forward side of the frame comprises the seat pillar tube A, the lower forked end E of this member A, being preferably in line with the axis of the driving or intermediate pulley or sprocket. To the said lower end E is pivoted the forward end of a pair of substantially horizontal rods D representing the base of the frame and serving to carry at the rearward end H the rear wheel spindle R. It will be understood however that the forward end of rods D may be of forked shape sufficiently wide to encompass the lower forked end E of said pillar tube A. The side of the frame opposite the base is represented by a pair of rods B which are located at the position usually occupied by the top bar of the usual carrier. The rear member of the frame is composed of a pair of rods C, jointed at G and H to the rods B and D respectively. To the rearward corners G and H of the frame are connected diagonally disposed tension and compression rods J and K, these rods being linked or jointed at their forward free ends L and M to the ends T and U respectively of the spring N secured pivotally at O to the seat pillar tube A. The connection at the upper end T of the spring N is conveniently made direct to rods K or through a link as shown by Fig. 4, but at the lower end U a bell crank lever P, Q pivoted on the cycle frame is preferably interposed, the free end of the rods J being jointed to one arm Q of the lever P, Q, the other arm P of which is linked to the end U of the spring N. A turnbuckle as at S is preferably provided for adjusting the tension of the spring.

The improved rear framing arrangement may also be applied to some makes of cycle-car.

On vertical movement of the rear wheel rods K will be under compression and rods J in tension causing a variation in the deflection of the spring.

By virtue of the arrangement described, stretching of the driving chain or belt due to the displacement of the rear wheel relatively to the frame is obviated.

Having described my invention what I claim and desire to secure by Letters Patent of the United States is—

1. A rear framing for motor cycles comprising, in combination, a set of rods jointed together and forming a substantial quadrilateral; and resilient means connecting approximately diagonally opposite portions of the quadrilateral.

2. A rear framing for motor cycles comprising, in combination, a set of rods forming a substantial rhomboid; and rods disposed substantially diagonally of said rhomboid and yieldably connecting approximately opposite parts of the frame.

3. A rear framing for motor cycles comprising, in combination, a set of rods forming a rhomboid one of whose corners is located adjacent to the cycle seat, diagonally disposed rods one end of each of which is pivoted at a corner of said rhomboid and the other end of which is movable, and resilient means connecting the movable ends of said diagonally disposed rods, said means including a spring substantially as described.

4. A rear framing for motor cycles, comprising, in combination, a set of rods jointed together and forming a substantial rhomboid, one of said rods being the seat pillar tube; diagonal rods pivoted to the rear side of the rhomboid; and means yieldably connecting the diagonal rods to the pillar tube.

5. A rear framing for motor cycles, comprising, in combination, a set of rods jointed together and forming a substantial rhomboid, one of said rods being the seat pillar tube; diagonal rods pivoted to the rear side of the rhomboid; and means yieldably connecting the diagonal rods to the pillar tube; said means comprising a spring having its intermediate part fulcrumed on the pillar tube its upper end engaging one of the diagonal rods and its lower end provided with a connection to the other diagonal rod, said connection including a bell-crank fulcrumed on the lower part of said frame and having one end engaged by the other diagonal rod and the other end connected with said spring.

In testimony whereof I have signed my name to this specification in the presence of two subscribing witnesses.

GEORGE FEATHERSTONE SHIMMIN.

Witnesses:
JOSEPH WATTS MONKHOUSE,
THOMAS DOBIE.

Copies of this patent may be obtained for five cents each, by addressing the "Commissioner of Patents. Washington, D. C."